United States Patent [19]

Wiese

[11] 4,019,625
[45] Apr. 26, 1977

[54] BUCKET CONVEYOR

[76] Inventor: Hans Holger Wiese, Wieloweg 9, 3001 Fuhrberg, Germany

[22] Filed: May 19, 1975

[21] Appl. No.: 578,590

[30] Foreign Application Priority Data

May 24, 1974 Germany .......................... 2425036

[52] U.S. Cl. ............................... 198/708; 198/711; 198/713; 198/715
[51] Int. Cl.² ....................................... B65G 17/12
[58] Field of Search ........... 198/140, 145, 148–153, 198/707, 708, 711–715

[56] References Cited

UNITED STATES PATENTS 732,499    6/1903   Austin .............................. 198/149
3,144,123  8/1964   Wiese .............................. 198/149

*Primary Examiner*—Evon C. Blunk
*Assistant Examiner*—Joseph E.. Valenza
*Attorney, Agent, or Firm*—Allison C. Collard

[57] ABSTRACT

A bucket conveyor has buckets which are supported by transverse elements extending between two conveyor belts, each conveyor bucket being connected to the neighboring bucket at the transverse element but without pivotal movement between the buckets at this connection, flexure of the conveyor belts at drive and guide rollers being accommodated by bending of a part of one of the transverse bucket walls of reduced thickness.

4 Claims, 2 Drawing Figures

BUCKET CONVEYOR

BACKGROUND OF THE INVENTION

This invention relates to a bucket conveyor the buckets of which are pivotally suspended from transverse elements carried by a pair of toothed endless carrying belts made of rubber or synthetic material, running over drive and guide wheels or rollers.

Bucket conveyors are known in which bucket-carrying chains run over sprocket wheels the intertooth spacing of which is equal to that of the opening of the bucket, so that the buckets, when passing around a sprocket wheel, do not undergo a change of shape, and consequently can be of rigid construction. When using endless carrying belts, the spacing of the buckets is reduced relatively to the length of the chord interconnecting two points on a curved part of the conveyor path, which is less than the length of the arc of the curved path between said points. Because of this, in conventional constructions of such bucket conveyors, it is necessary to use flexible buckets made of synthetic material which, on their two sides transverse to the direction of travel, are hinged to one another and suspended from the transverse elements interconnecting the two carrying belts. These flexible buckets are deformed by each conveyor drive or guide roller. Brittle materials cannot be conveyed in such flexible buckets because they are exposed to lateral shear and compression stresses. Moreover, when conveying powderlike materials, such materials can penetrate between the sliding surfaces of the hinges of the articulated parts of the buckets.

Attempts have been made to combine the advantages of both types of bucket conveyors, and to avoid their disadvantages. In the bucket conveyor installation described in German Patent Specification No. 1,150,921 a solution is described in which the conveyor buckets, hinge-suspended from a pair of toothed endless carrying belts, are mutually supported by an intermediate elastic member positioned between them. In this manner each bucket is supported by the conveyor transverse elements only on one of its longitudinal edges transverse to the direction of travel, whilst the other longitudinal edge is supported against the adjoining bucket by means of the elastic member. The elastic support members compensate for the difference between chord and arc length of the curved portions of the conveyor belts passing around the drive and guide rollers so that the buckets are not subjected to a change of shape and can be of rigid construction.

For some applications, however, the use of an additional elastic support member can prove disadvantageous since it must be made of a material other than that of the actual bucket, in particular a flexible elastic material. The elastic material used (for example, rubber) is not resistant to all the conveyed chemicals. Furthermore, the front edge of each conveyor bucket only rises to the level of the elastic support member, so that the capacity of the bucket is correspondingly limited.

An object of the present invention is to provide a bucket conveyor of the aforementioned type which is so constructed that the bucket can be filled to a level higher than that of the transverse connecting elements of the conveyor.

It is a further object to provide conveyor bucket supports which are as resistant to chemicals as all the other parts of the bucket.

SUMMARY OF THE INVENTION

According to the invention there is provided a bucket conveyor having two toothed endless flexible carrying belts of rubber or synthetic material running over drive and direction guide wheels or rollers and interconnected by transverse elements on which the interlocking substantially rigid buckets are suspended, wherein the leading wall of each bucket transverse to the direction of travel is directly connected, without an intermediate connection member, to the rear wall of the respective preceding bucket.

As a preferred feature of the bucket conveyor according to the invention it is proposed that the front edge of the leading wall of each bucket transverse to the direction of travel is provided with a tubular projection having a transversely extending through hole through which the respective transverse element of the conveyor passes, the said projection engaging in a longitudinally split socket on the rear wall of the respective preceding bucket in the direction of travel, the part of each bucket leading wall adjacent the connection with the preceding bucket having a reduced wall thickness permitting flexure of this part of the said wall.

In order to increase the capacity of the bucket, the rear wall of each bucket preferably extends beyond the connection with the leading wall of the following bucket with an angle of inclination to the direction of travel of the conveyor which is the same as that of the leading wall of the following bucket when the conveyor is travelling along a straight path.

BRIEF DESCRIPTION OF THE DRAWINGS

An embodiment of the present invention is illustrated, by way of example, with reference to the accompanying drawings, wherein.

DETAILED DESCRIPTION OF THE ILLUSTRATED EMBODIMENT

Figure 1:
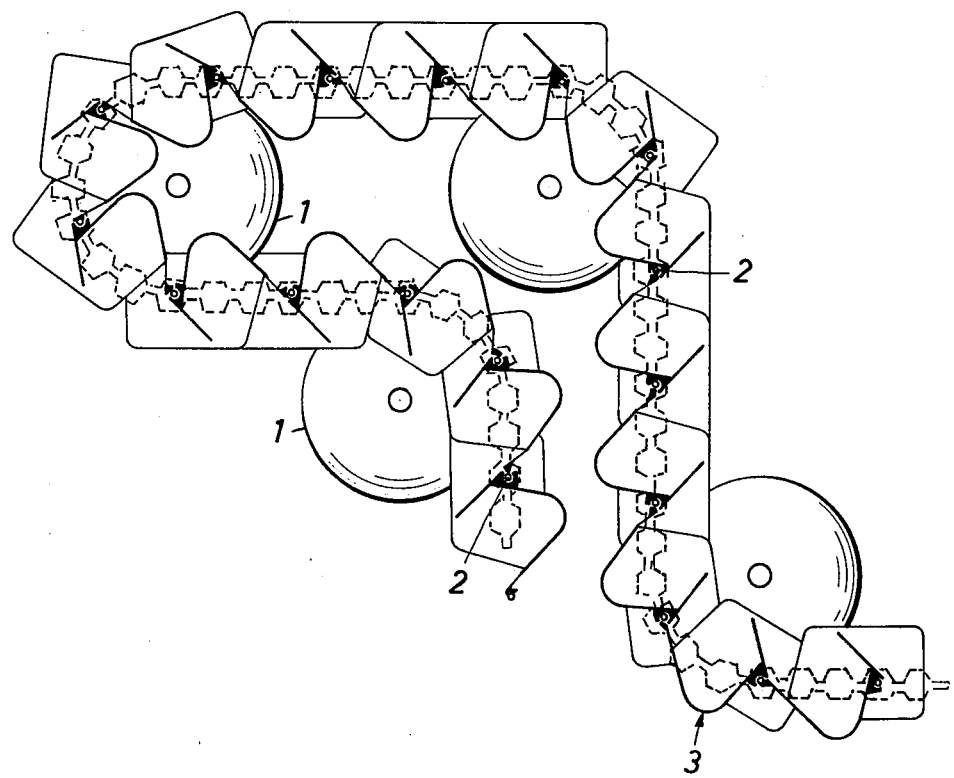
FIG. 1 is a schematic side elevation of a bucket conveyor according to the invention with a number of guide rollers.

The bucket conveyor shown in FIG. 1 has drive and guide wheels or rollers 1 over which pass two toothed endless belts shown in dashed line. The provision of teeth on the belts prevents relative displacement of the two belts, so that transverse connecting elements comprising crossbars 2 always remain with their longitudinal axes perpendicular to the direction of travel of the belts.

Figure 2:
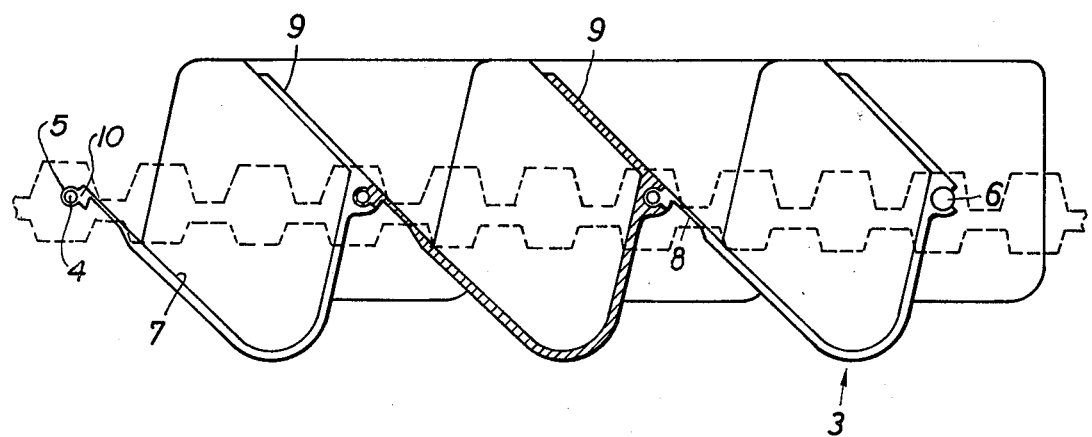
FIG. 2 is a side elevation of a number of interlocking buckets of the conveyor shown on an enlarged scale compared with FIG. 1.

The conveyor buckets 3 are rigidly constructed of synthetic material with a smooth surface, so that the conveyed material is readily loosened from the bucket walls. The conveyor buckets 3, as shown in FIG. 2, are formed with respective cylindrical transverse through holes 4 by which they are mounted on the crossbars 2 so that they can swing about the transverse axes of the crossbars. For this purpose each bucket 3 is provided on the transverse edge of its leading wall with a transversely extending tubular projection 5 the bore of which constitutes the transverse hole 4 and at its other transverse edge with a longitudinally split socket 6, the projection 5 of each bucket 3 snap-engaging in the split socket 6 of the preceding bucket in the direction of travel.

The leading transverse wall 7 of each bucket 3 has in its upper part adjoining the projection 5 a weakened region 8 which is considerably thinner than the other substantially rigid walls. This weakened region 8 imparts the necessary elasticity to the wall 7 to compensate for the aforementioned difference between chord and arc length of the curved conveyor belts when passing around a roller.

The part of the rear wall 9 of each bucket 3 which projects upwardly above the socket 6 has the same angle of inclination to the direction of conveyor travel as the leading transverse wall 7 of the following bucket 3 when the conveyor path is straight. Similarly the leading transverse wall 7 can be extended beyond the respective projection 5 thus providing an increased bucket capacity. There is therefore achieved an accurately aligned connection between the front transverse wall 7 of each bucket 3 and the rear transverse wall 9 of the preceding bucket.

The projection 5 of each bucket 3 is prevented from rotation within the socket 6 in which it engages by the engagement of external shoulders 10 on each tubular projection 5 with the edges of the respective socket 6. This in turn minimises the intrusion of particles between the sleeve 5 and the socket 6 which could otherwise lead to premature wear when the conveyor is used to carry powderlike materials.

Apart from having a high load conveying capacity, the bucket conveyor according to the invention has the advantage of affording flexible connections between the buckets which are more resistant to abrasive wear than conventional pivotal connections, the connections also having a greater resistance to attack by corrosive chemicals than conventional connections between conveyor buckets.

I claim:

1. In a bucket conveyor comprising two toothed endless flexible carrying belts of elastomeric material, drive and guide rollers over which the belts pass, transverse elements interconnecting the belts, and buckets suspended from said transverse elements, said buckets having a substantially rigid leading wall and a substantially rigid trailing wall which extend in a direction transverse to the direction of travel and substantially rigid side walls connected to said trailing wall, portions of adjacent leading and trailing walls being interlocked at the transverse element without relative movement therebetween, the improvement comprising a weakened region in each of said leading walls extending across the width thereof adjacent to said transverse elements forming a flexible wall part, said weakened region being below said transverse elements and being free of any connection with said side walls and being connected to the rear wall of the preceding bucket, said weakened region having a reduced cross-section relative to the remainder of said leading wall, thereby permitting flexing of the interlocked buckets.

2. The bucket conveyor defined in claim 1, wherein the front edge of the leading wall of each bucket transverse to the direction of travel has a transversely extending tubular projection, the respective transverse element of the conveyor passing through the tubular projection, and wherein the rear wall of the respective preceding bucket in the direction of travel carries a longitudinally split socket member in which the tubular projection of said bucket engages, the part of each bucket leading wall adjacent the connection with said preceding bucket having said weakened region permitting flexure of this part of said wall.

3. The bucket conveyor defined in claim 1, wherein the rear wall of each bucket extends beyond the connection with the leading wall of the following bucket with an angle of inclination to the direction of travel of the conveyor which is the same as that of the leading wall of the following bucket when the conveyor is travelling along a straight path.

4. The bucket conveyor defined in claim 2, wherein the connections between adjoining buckets prevent pivotal movement between the buckets, curvature of the conveyor belts at said drive and guide rollers being accommodated solely by flexure of the flexible wall part of each bucket.

* * * * *